Sept. 13, 1960   D. E. GRISWOLD   2,952,363
BATCH FEEDING APPARATUS AND SYSTEMS
Filed June 8, 1954   2 Sheets-Sheet 1
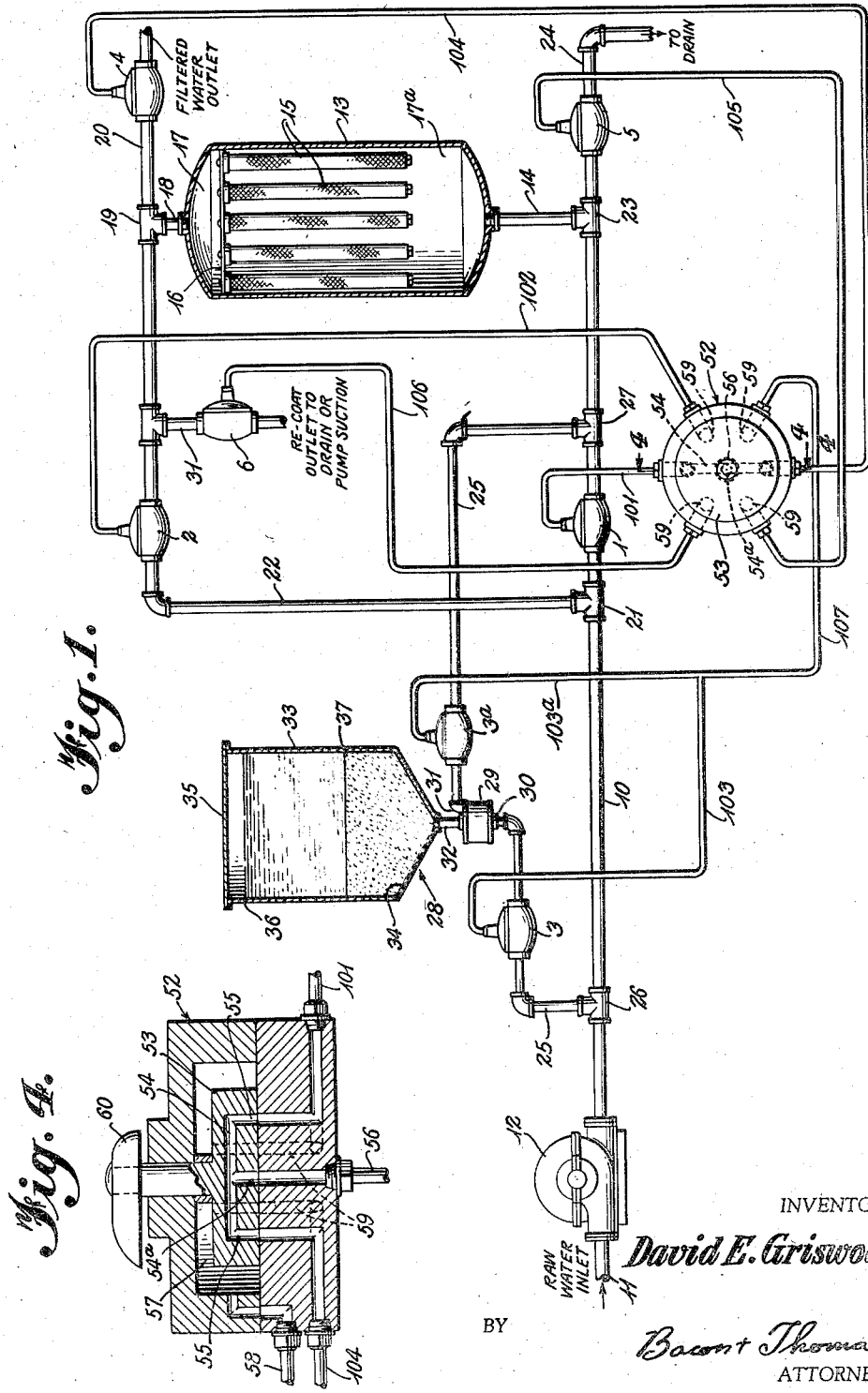
INVENTOR
David E. Griswold
BY
Bacon + Thomas
ATTORNEYS

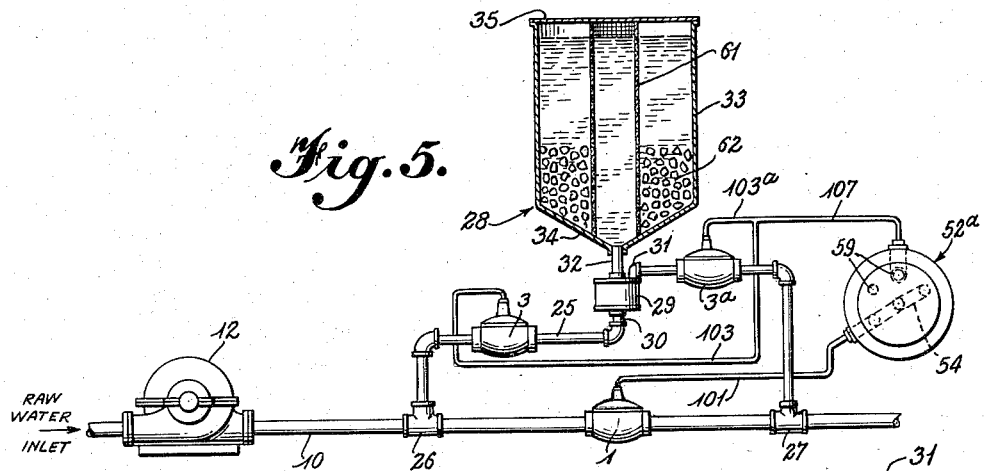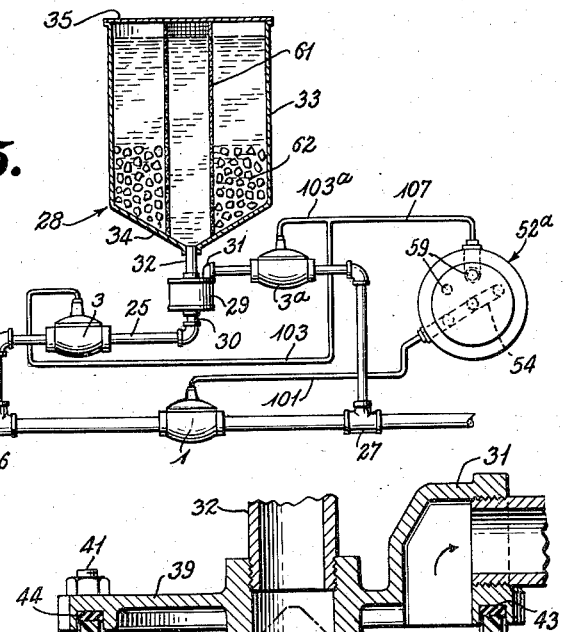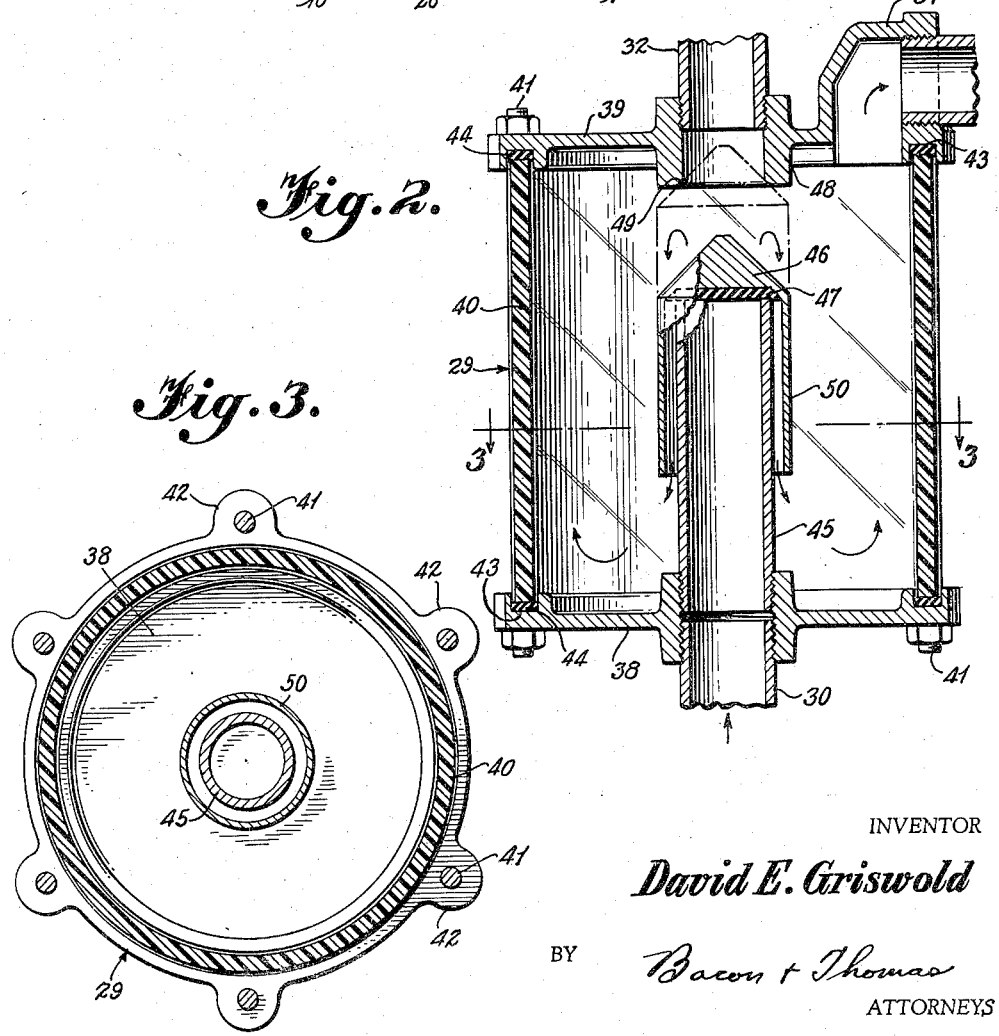

United States Patent Office

2,952,363
Patented Sept. 13, 1960

2,952,363

BATCH FEEDING APPARATUS AND SYSTEMS

David E. Griswold, San Marino, Calif., assignor to Donald G. Griswold, Alhambra, Calif.

Filed June 8, 1954, Ser. No. 435,250

13 Claims. (Cl. 210—193)

This invention relates to an automatically operable feeder device for feeding various liquids and/or solid flowable materials to a pipeline or system, and, more particularly, to a device for feeding such materials in batch form of predetermined volume.

The invention further relates to a feeder for supplying treating material to an apparatus or system requiring periodic regeneration or reconditioning, and to means for controlling the operation of the feeder in proper sequence with the regenerating or reconditioning cycle of a given apparatus or system.

The invention still further relates to a fluid flow system embodying the present feeder together with apparatus including an element requiring periodic cyclic treatment, and valves and valve control means for controlling the cycle of treatment.

The batch feeding apparatus of the invention is of general utility and may be used for feeding a measured quantity of any type of fluid to a fluid flow system. It is operable to feed liquids of various viscosities and may also be employed to feed suspensions, slurries, and the like, to any system in which such materials are to be incorporated. It is also operable as a feeder of powdered solids which act in the manner of fluids.

The batch feeder is advantageously employed in water purification systems in which, for example, it may feed disinfecting chemicals to a water supply, a slurry of filter aid to a filter, or it may be used to supply coagulant materials to raw water containing impurities to be removed by flocculation. It may also be used in a water softening system to supply regenerating chemicals to an ion-exchanger.

An important aspect of the invention relates to the use of the novel batch feeder to supply the filter aid required for precoating and recoating the elements of a filter, and to a combination of the feeder and filter with valve control means for controlling the filtering, backwashing, and coating operations. In this system, the feeder is positioned to supply filter aid material directly to the supply line of the liquid to be filtered and normally this material would be introduced into a portion of such liquid during the filter coating operation. It will be readily apparent, however, that the feeder could also be incorporated in a filter system in such manner that the filter aid would be carried to the filter by other liquid media.

In another aspect of the invention, a modified form of the apparatus may be used as a chemical dissolver and as a feeder of saturated solution to a flow system.

An object of the invention is to provide a novel batch feeder for introducing materials into a fluid flow system.

Another object of the invention is to provide a feeder of the type described, which is simple in construction, easy to operate and which has relatively few moving parts.

Another object of the invention is to provide a batch feeder which is operable on a wide range of fluids, including solutions, magmas, slurries, or suspensions, and which will withstand the abrasive action of entrained particles in such fluids.

Another object of the invention is to provide a batch feeder in which the feeding operation may be visually observed.

Another object of the invention is to provide a device which will perform the functions of dissolving a solid and of feeding the resultant solution to a fluid flow line.

Another object of the invention is to provide a feeder for supplying fluids to a flow line in which the liquid level in the feeder is readily maintained by simple replacement of the additive material with an equivalent volume of liquid from the flow line.

Another object of the invention is to provide a feeder of the type described which is operable by the liquid in the fluid flow line to supply a predetermined quantity of feed material to such liquid.

Another object of the invention is to provide a feeder operable to feed a predetermined portion of material to a fluid flow line when connected thereto and which is adapted to be bypassed relative to said fluid flow line to prepare a further measured quantity of material for feeding to said fluid flow line in a subsequent operation.

Another object of the invention is to provide a system incorporating feeding means of the type described in combination with valve control means for such system.

Another object of the invention is to provide a bulk feeder for supplying a slurry of filter aid to a filter system and valve control means for controlling such feeding operation.

These and other objects and advantages, which will become apparent as the ensuing description proceeds, are accomplished by this invention wherein the novel feeder comprises briefly, a feed chamber having an inlet and an outlet for the flow of fluids into which additive materials are to be incorporated, a superimposed container or tank of relatively large dimensions for holding or preparing a replenishing quantity of the additive materials operably connected to the feed chamber, and closure means in the chamber responsive to a flow of fluid through the inlet to the chamber to close the connecting means between said chamber and replenishing tank, whereby the batch of material in the chamber is picked up by the inflowing liquid and is carried out of the chamber with this liquid. The flowing liquid thus removes all material from the chamber and said chamber then becomes filled with liquid. The closure means automatically reopens when liquid flow through the inlet to the chamber is stopped, whereby another batch of additive material may descend by gravity into the chamber from the superimposed tank, thereby displacing the liquid from said chamber and causing it to ascend into the superimposed tank. The novel closure means is also so designed as to serve as means to insure agitation of the material in the chamber by the inflowing liquid whereby all of the material is dispersed into the liquid during its passage through the chamber.

In a further aspect of the invention the feeder is incorporated in a valve controlled by-pass line whereby the manipulation of the valves in this line and the main fluid flow line automatically control the feeding of a batch of material from the feeder to the main fluid flow line.

In the accompanying drawings, which illustrate preferred embodiments of the invention:

Figure 1 is an elevational view, partially in section, and partially diagrammatic, of a filter system incorporating the feeder and control means of this invention.

Figure 2 is a vertical sectional view showing the proportioning chamber of the novel feed device.

Figure 3 is a cross-sectional view taken on the line 3—3 of Figure 2.

Figure 4 is a diagrammatic sectional view of the pilot valve control mechanism shown in Figure 1 and taken along the line 4—4 thereof.

Figure 5 is an elevational view, partially in section, of a modification of the feed device and system which is particularly useful in dissolving salts and feeding saturated solutions.

Referring now to the drawings in detail, and particularly to Figure 1, there is shown a fluid flow line 10 having an inlet 11 and a pump 12 for forcing liquids through a system which includes a filter 13 having an inlet conduit 14. The filter 13 may advantageously be of the type having a plurality of filter tubes 15 which may, for example, be constructed of fine wire cloth, or porous ceramic, Carborundum or stone, or may be of canvas covered perforated tubes, or other forms providing suitable openings through which the liquid to be filtered may flow. In this type of filter a filter medium or aid, such as a diatomaceous earth, is supported by the tubes 15. The tubes 15 are normally precoated with the diatomaceous earth, which is built up on the exterior of the filter aid supports by passing a slurry of the diatomaceous earth through the filter with a portion of the liquid to be filtered prior to the service run. The diatomaceous earth carried in suspension in such liquid collects upon the filter supports until a filter coat of substantial thickness is obtained.

A header 16 in the tank 13, from which the tubes 15 are suspended, divides the tank into two chambers, 17 and 17a. The upper or effluent chamber 17 formed by the header 16 is provided with an outlet 18 connected by T 19 to an outlet 20 for the filtered effluent liquid. The lower or influent chamber 17a receives the water to be filtered. In a normal filtering operation water enters the line 10 through pump 12, passes into the chamber 17a of the filter tank 13 through the inlet 14, passes through the filter elements 15, where the filtering action occurs, and then passes out through lines 18 and 20 to the point of use.

Filters of the type described are conventionally backwashed after they have become somewhat clogged in order to rejuvenate the filter elements by removing the diatomaceous earth and foreign material adhering thereto, and then recoated with clean diatomaceous earth prior to reuse. For the backwashing operation, the supply line 10 is provided with a T 21 and a branch line 22 which connects with T 19. The inlet 14 to the tank 13 is also provided with a T 23 which connects to a drain line 24. During the backwashing operation, which is controlled by valves in a manner described hereinafter, the liquid from the main line 10 is caused to pass through branch line 22, T 19, line 18, into the chamber 17 of the filter and in reverse direction through the porous tubes 15 out of the tank 13 through line 14 and thus to drain through line 24.

In order to supply filter aid or diatomaceous earth for recoating the filter elements 15 after a backwashing operation, a by-pass line 25 is connected with the main line 10 by means of T's 26 and 27. In this by-pass line, the batch feeder of this invention, generally designated as 28, is provided for feeding diatomaceous earth slurry. The batch feed device 28, which constitutes an important feature of the system described, comprises a chamber 29 having an inlet 30 and outlet 31 whereby it is connected in by-pass line 25. The chamber 29 further is provided with a conduit 32 connecting it to a superimposed feed tank 33. Feed tank 33 may have a generally conical bottom 34 in order to facilitate the passage of material by gravity into communicating conduit 32. The tank 33 is adapted to store a relatively large bulk of diatomaceous earth which is fed as needed to chamber 29. The tank 33 may be replenished from time to time through any suitable means, it being understood that the top of the tank, while provided with a removable cover 35, is normally open to the atmosphere. As is shown in Figure 1, liquid normally fills the tank 33 to approximately the level shown at 36 and is maintained at approximately this level by the operation of the feeder as hereinafter explained. Finely divided diatomaceous earth may, during the use of the apparatus, settle in the tank 33 to a level substantially as shown at 37.

The chamber 29, which is shown in detail in Figure 2, comprises a lower plate 38 and an upper plate 39 between which is held a cylindrical side wall 40. A plurality of bolts 41, in cooperation with projecting lugs 42 on the top and bottom plates 39 and 38, hold these plates tightly relative to the ends of the wall 40. Channels 43 in the top and bottom plates are provided with sealing members 44, in order to assure a liquid-tight seal and to accommodate the edges of the wall 40.

The cylindrical wall 40 of chamber 29 is preferably of transparent material, in order that visual observation of the operation in this chamber may be made.

Within the chamber 29, in axial alignment with inlet 30 and conduit 32, is a standpipe 45, which terminates in the upper portion of this chamber as shown. The upper end of the standpipe 45 is provided with an inverted cup-like plunger or closure member 46, which is mounted for reciprocating motion with respect to the standpipe in such a manner that when in its lower position, as shown in solid lines in the drawing, it forms a closure for the top of the standpipe, and when in its advanced position, as shown in the broken lines in the drawing, it forms a closure for the conduit 32. The inner bottom portion of the cup-like plunger member 46 is preferably provided with a resilient washer or disc 47 in order to provide a better seal with the top of standpipe 45. A boss 48 on the inner face of the plate 39 preferably is beveled at its bottom edge as shown at 49 to more fully accommodate and form a seal with the conical top of the plunger member 46.

In the lower position of member 46, as shown in Figure 2, the member 46 acts as a check valve to prevent slurry from entering standpipe 45 and line 30. When liquid at line pressure is entering through line 30, the pressure lifts the member 46 into the position shown in the broken lines, whereby the conical shaped top acts as a valve thereby closing the conduit 32. The plunger member 46 is provided with a cylindrical skirt portion 50, which acts to hold the member in alignment with the standpipe and communicating conduit 32, and also acts to divert the flow of fluid from the top of standpipe 45 downwardly, whereby the settled solids in the chamber 29 are agitated and are picked up by the flowing fluid and removed from the chamber through outlet 31.

By use of a chamber 29 of a selected volume it is apparent that a predetermined bulk of slurry or other liquid may be collected in the chamber for entrainment by the entering liquid when chamber 29 is connected into the fluid flow line. As will be explained later herein, after the by-pass line 25 has been closed and the plunger member 46 retracts, bulk feed material settles down through communicating line 32 refilling the chamber 29 preparatory to a subsequent operation.

An important feature of this feeder is the fact that once filled to the desired level, as for example to the level shown at 36, it thereafter, during operation, automatically maintains substantially this same liquid level without requiring any complex liquid level control apparatus. This is possible by reason of the fact that any additive material descending into the chamber 29 when the plunger 46 is in the down position between runs simply displaces an equal volume of liquid from chamber 29, which liquid rises into the tank 33 to maintain the liquid level therein substantially constant. In other words, there is simply a transfer of additive material in tank 33 for liquid in chamber 29. During operation of the feeder to supply material to the fluid flow line, the additive material in chamber 29 is replaced with another volume of liquid from the flow line. While the solids in tank 33 obviously must be replaced from time to time, no replacement of liquid is necessary once the operation is started.

In accordance with a further aspect of the invention, a number of control valves designated as 1, 2, 3, 3a, 4, 5 and 6 are provided in the fluid flow line 10, the branch line 22, and the by-pass line 25. The valves shown in the embodiment of the invention illustrated in Figure 1 are conventional diaphragm valves of the hydraulic pressure control type. Such valves are usually provided with a diaphragm which, in response to hydraulic pressure in a connected hydraulic system, operates to close the valve opening. The valve normally opens by line pressure when the closing pressure in the hydraulic connecting line to the valve is released.

It will be understood that the system could also employ valves operated by other means without departing from the principles and scope of the invention. For example, the valves could be solenoid operated and controlled by an electrical selector system.

In the system shown, each of the hydraulically controlled valves 1, 2, 3, 3a, 4, 5 and 6 are connected by accompanying hydraulic pressure lines 101, 102, 103, 103a, 104, 105 and 106 respectively to a pilot control valve or selector device generally designated as 52. The pilot valve 52 has for its purpose the control of the diaphragm valves in sets in order to control the cycle of operations of the filter system. Accordingly, in normal service operation, by proper pilot valve control of the opening and closure of certain of the valves, liquid to be filtered may be caused to pass through the filter tank 13 and filter elements 15 and out through the outlet 20 to the point of use of the liquid. By proper manipulation of the pilot valve 52, operation of the valves may be changed so that the backwashing operation becomes effective. Liquid now passes through the branch line 22, T 19 and in reverse flow through the filter elements 15 out through lines 14 and 24 to the drain. By further manipulation of the pilot valve 52, the valves are operated so that liquid from the line 10 passes through branch line 25, picks up a slurry of diatomaceous earth from feeder 28 and passes it through T 27 into the filter tank 13 where the diatomaceous earth is deposited on the tubes 15 to effect a coating operation, and the liquid carrier for the diatomaceous earth passes through a drain or outlet 31.

In order to effect this sequence of valve control, the pilot valve device 52, as best shown in Figure 4, is provided with a rotatable disc 53 in which is provided an exhaust passage 54 having a drain port 54a extending axially therefrom and terminating at the lower face of said disc. The passage 54 has communicating openings 55 at its ends, which may be so positioned as to connect any two of the lines from the diaphragm valves to a drain line 56 registering with the port 54a. Hydraulic pressure is normally maintained in all of the lines not connected to the drain line 56 by means of a pressure chamber 57 in the pilot valve body suitably connected to a source of fluid under operating pressure by line 58. Four pressure ports 59 extend through the pilot disc 53 and simultaneously connect four lines at a time to the associated diaphragm valves while the lines to the other two valves are connected to the drain. The lines 103 and 103a from valves 3 and 3a are connected so that a single line 107 connects these lines with the hydraulic controller. Accordingly, when the pilot disc 53 is in the position shown in the drawings, the lines 101 and 104 from valves 1 and 4 are connected to the drain line 56 and valves 1 and 4 are, therefore, open. Hydraulic pressure is maintained in all of the other lines thereby maintaining valves 2, 3, 3a, 5 and 6 closed. Liquid to be filtered therefore passes through line 10, open valve 1, through the filter 13, and out of the service line 20 through open valve 4. When it is desired to backwash the filter, selector knob 60 on the pilot valve 52 is turned to rotate the disc 53 clockwise through an angle of 60° so that exhaust passage 54 now connects valves 2 and 5, through the lines 102 and 105, to the drain line 56. Valves 1 and 4 now close and valves 3, 3a and 6 remain closed since the lines 101, 104, 107 and 106 associated therewith are subject to pressure through the pilot ports 59, and valves 2 and 5 open. Liquid from line 10 now flows through branch line 22, open valve 2 through the tank 13 and filter tubes 15 in reverse flow and out through open valve 5 to the drain 24. After the filter has backwashed for a sufficient time the selector knob 60 may be turned clockwise through another 60° to connect valves 3, 3a, and 6 to the drain line 56 through lines 103, 103a and 107 and line 106. All valves are now closed except valves 3, 3a and 6 which are now open. Liquid passes through by-pass line 25, picks up a slurry of diatomaceous earth or filter aid from feeder 28, passes through open valve 3a through inlet 14 into the filter tank 13. Filter aid is deposited on elements 15 and the liquid carrier for such filter aid passes out through open valve 6 to a suitable drain. The selector knob 60 may now be turned clockwise 60° to open the valves 1 and 4, and to maintain valves 2, 3, 3a, 5 and 6 closed to restore the filter to normal service flow.

It will be understood that suitable automatic timing mechanism may be connected to the pilot valve 52 so as to rotate the element 53 in timed sequence, whereby normal filtering, backwashing and recoating operations of the filter elements 15 may be automatically performed.

In the embodiment of the invention shown in Figure 5, the superimposed tank 33 may be provided with a centrally disposed filter, screen, or a strainer 61 in order to retard the passage of solids into the line 10. This modification is particularly suitable where the feeder device is to be used for dissolving salts and feeding saturated solutions into a fluid flow line. In the tank 33, as shown in Figure 5, salt crystals 62 fill the bottom portion of the container and are disposed around the central strainer 61. Liquid above and between the salt crystals dissolves a portion of the crystals to form a saturated solution which passes through the strainer 61 and settles into chamber 29, displacing the liquid of lower specific gravity therefrom and forcing it up into tank 33, when the plunger member 46 in said chamber is retracted. The device, therefore, acts as a feeder of a measured quantity of saturated solution to the liquid passing through chamber 29. Accordingly, the device may be used for any purpose where it is desired to form a solution from solids and a measured amount of this solution is desired to be introduced into a flow system. For example, the device may be used for passing a solution of alum or the like to a water line for coating a sand type filter, or it may be used for injecting disinfecting solutions into the water recirculated in a swimming pool, or for dissolving salt and injecting the resulting brine into a line for passage to a water softener during the regeneration cycle.

In operation of the feeder as a dissolver and feeder of solution, it again has the advantage of requiring no liquid addition to maintain the liquid in the superimposed or dissolving tank 33. Thus, the saturated solution by reason of its higher specific gravity replaces the water or other liquid from chamber 29 between feed runs when the valve member 46 is down. The liquid from chamber 29 causes a further portion of salt to be dissolved and again a saturated solution in equilibrium with the salt crystalts is formed. It will be understood that in this modification, while the liquid level in the tank 33 may drop in proportion to the volume of the salt dissolved, the actual liquid volume remains substantially constant. The liquid level is again restored by dumping in another supply of salt after that in the tank has become substantially exhausted.

In Figure 5 the valve control system is shown as incorporating only three valves 1, 3 and 3a, the valves 3 and 3a being connected in a pipe 25 arranged in by-passing relation to the valve 1. It will be understood that these valves may be manually or hydraulically operated in the same manner as described in connection with Figure 1. Accordingly, a pilot valve 52a may act to open valve 1 and simultaneously close valves 3 and 3a, whereby liquid is passed directly through the main line 10, and in a subsequent operation the pilot controller may act to close valve 1 and at the same time open valves 3 and 3a, whereby the liquid passes through the measuring chamber 29 picking up in transit the desired amount of saturated solution.

It will be apparent that in operation of the feeder 28, in either of the embodiments shown, the superimposed feed tank 33 may be replenished from time to time, as necessary, without disturbing the operation of the batch feeding chamber 29. Thus, when the salts or other solids in tank 33 become nearly exhausted it is merely necessary to dump in an additional supply without resorting to the precaution of exact measurement. The tank 33 further may provide the dual function of preparing the feed solution or slurry and of storing the prepared material until it is called upon for a replenishing batch.

Should any clogging of the system occur or should the system for any other reason fail to properly operate, the operator may quickly determine by visual observation through the transparent side walls of chamber 29 whether this element of the device is functioning properly. However, since the plunger 46 is the only moving part of the feed device, mechanical failure at this point is a rare occurrence.

Whereas this invention has been described in terms of specific apparatus and systems, it is to be understood that this has been by way of illustration only and is not to be deemed limiting in any sense, the invention being limited solely by the scope of the appended claims.

I claim:

1. Feeding apparatus comprising the combination of means providing a metering chamber of predetermined volume for metering additive material, said metering chamber having a liquid-flow inlet for introducing liquid into the lower portion thereof and a liquid-flow outlet in the upper portion thereof and also having an additive-material inlet in the upper portion thereof for gravity feeding of said additive material into said metering chamber, and closure means in said metering chamber responsive to the flow of said liquid through said metering chamber to close said additive-material inlet when liquid is flowing through said metering chamber and thereby prevent additive material from entering said metering chamber and prevent liquid flow from passing through said additive material inlet; and to open said additive-material inlet and close said liquid-flow inlet when liquid ceases to flow through said metering chamber, whereby said metering chamber is successively filled with metered batches of said additive material during conditions of non-flow and said batches are successively evacuated from said chamber during conditions of flow.

2. A filter system, comprising: a filter tank adapted for the passage of liquid therethrough in one direction in a filtering operation and for the passage of liquid therethrough in the reverse direction in a backwashing operation, said tank including filter elements requiring periodic re-coating with additive material; a flow conduit connected with a source of liquid flow, said flow conduit communicating with said filter tank for the flow of liquid therethrough in said one direction; a backwash conduit connected to said flow conduit; valve means for diverting liquid flow from said flow conduit into said backwash conduit, said backwash conduit communicating with said filter tank for the passage of said liquid therethrough in said reverse direction; a by-pass line connected in said flow conduit; valve means for diverting liquid flow from said flow conduit through said by-pass line for delivery to said tank during a filter-element recoating operation; an additive-material feeder in said by-pass line, said additive-material feeder including means forming a metering chamber having an inlet and an outlet for the flow of liquid therethrough and an additive-material inlet connected with a source of additive material and also including valve means responsive to flow at said liquid-flow inlet to close said additive-material inlet and maintain said additive-material inlet in closed condition during said flow and responsive to a cessation of said last-mentioned flow to open said additive-material inlet and permit filling of said chamber with said measured batch of additive; and unitary valve-control means for operating all except said last-mentioned valve means to effect liquid flow successively through said flow conduit, said backwash conduit and said by-pass conduit for the sequential operations of filtering, backwashing, and recoating, respectively.

3. In a system having valved conduit means, a valved by-pass line communicating with said valved conduit means, means defining a metering chamber of predetermined volume connected in said by-pass line, a feed tank having means communicating with said metering chamber; closure means movable by the force of liquid flowing through said by-pass line to close said communicating means and maintain said communicating means in closed condition while said liquid is flowing and movable by gravity to open said communicating means for filling said metering chamber with additive material when liquid ceases to flow through said by-pass line, and a unitary valve control means for controlling flow of liquid through said valved conduit and through said valved by-pass line.

4. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having an inlet an an outlet for the flow of liquid through said metering chamber and also having an inlet for said additive material, and means movable by the force of liquid flowing through said metering chamber to a position obstructing flow of additive material into said metering chamber and the flow of fluid from said metering chamber through said additive-material inlet, said last-mentioned means being held in said position by the pressure of said liquid in said chamber while said liquid flow through said chamber is maintained, and said last-mentioned means being movable by gravity to a non-obstructing position relative to said additive-material inlet when liquid ceases to flow through said chamber.

5. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having an inlet and an outlet for the flow of liquid through said metering chamber and also having an inlet for said additive material, and closure means in said chamber responsive to the flow of said liquid through said chamber to close said additive-material inlet when liquid is flowing through said metering chamber and obstruct the flow of additive material into said metering chamber and the flow of liquid from said metering chamber and to open said additive-material inlet and close said liquid inlet when liquid ceases to flow through said chamber, whereby said chamber is successively filled with batches of said additive material during conditions of non-flow and said batches are successively evacuated from said chamber during conditions of flow therethrough.

6. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having a first inlet and an outlet for the flow of liquid through said metering chamber and also having a second inlet for said additive material, and valve means positioned in said chamber between said first and second inlets and movable by the force of liquid flowing through said metering chamber from said first inlet to a position obstructing flow through said second inlet and movable in response to the cessation of flow through said metering chamber from said first inlet to a non-obstructing position relative to said second inlet and to an obstructing position relative to said first inlet when liquid ceases to flow through said metering chamber, whereby said chamber is successively filled with metered batches of said additive material during conditions of non-flow and said batches are successively evacuated from said chamber during conditions of flow therethrough.

7. Feeding apparatus comprising the combination of: means providing a metering chamber defining a zone of predetermined volume for metering additive material, said chamber having an inlet for the introduction of liquid flow at one point in said zone and having an outlet spaced from said one point and separated from said one point by the central portion of said zone to cause liquid flow to pass through said zone, said chamber also having an inlet for said additive material; and a valve element in said chamber between said liquid-flow inlet and said additive-material inlet and movable by the force of liquid at said liquid-flow inlet to open said liquid-flow inlet and close said additive-material inlet when liquid is introduced at said flow-inlet to permit said liquid to flow through said zone and mix with the additive material therein; said valve element being movable by gravity to open said additive-material inlet and close said liquid-flow inlet when liquid ceases to flow into said chamber through said liquid-flow inlet, whereby said zone of predetermined volume is successively filled with metered batches of said additive material during conditions of non-flow, whereby liquid flow through said zone successively evacuates said batches from said chamber of predetermined volume during conditions of flow.

8. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having an inlet and an outlet for the flow of liquid and also having an inlet for said additive material, said liquid-flow inlet being positioned in the bottom portion of said metering chamber and being connected with a standpipe positioned in said metering chamber, said standpipe having an upper opening in substantially vertical alignment with said additive-material inlet and valve means in said metering chamber movable by the force of said liquid from said inlet passing through said standpipe to close said additive-material inlet when liquid is flowing through said chamber and movable in response to a cessation of said flow to open said additive-material inlet and to close said upper opening to prevent flow from said metering chamber into said standpipe, whereby said metering chamber is successively filled with metered batches of said additive material during conditions of non-flow and said batches are successively evacuated from said chamber during conditions of flow.

9. The device of claim 8 wherein said valve means comprises a plunger member mounted on the top of said standpipe for reciprocating movement between obstructing positions relative to the top of said standpipe and relative to said additive-material inlet during conditions of flow and non-flow respectively.

10. The device of claim 9 wherein said plunger member includes a skirt member surrounding the upper portion of said standpipe and extending downwardly therealong for a distance greater than the distance between the top of said standpipe and said additive-material inlet, whereby said skirt member serves as a guide in the reciprocating movement of said plunger member and also serves to direct liquid flow from said liquid-flow inlet toward the bottom of said metering chamber.

11. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having an inlet and an outlet for the flow of liquid through said metering chamber and also having an inlet for said additive material, and means responsive to the introduction of liquid into said metering chamber through said liquid-flow inlet to prevent the introduction of additive material through said additive-material inlet, said means being responsive to a cessation of flow through said metering chamber from said liquid-flow inlet to open said additive material inlet and close said liquid-flow inlet, whereby said metering chamber may be filled with a metered batch of additive material when said liquid is not being introduced into said metering chamber and said metered batch of additive material may then be evacuated from said metering chamber by the flow of liquid therethrough without the introduction of additional additive material.

12. Feeding apparatus comprising the combination of means defining a metering chamber for receiving and holding a predetermined volume of additive material for metering the same, said means including bottom wall means closing the bottom of said chamber to prevent gravity flow of said additive material therefrom, said chamber having an inlet and an outlet for connection in a liquid-flow line; a container of relatively greater volume than said chamber mounted in superimposed position above said chamber, said container being adapted to hold solids and a solution of said solids having a higher specific gravity than that of the liquid flowing through said liquid-flow line, connecting means between the bottom of said container and the top of said chamber for permitting gravity flow of said solution from said container to said chamber; means in said container for restraining the flow of solids into said connecting means while permitting the free flow of said solution, and means for opening said inlet and closing said connecting means in one cycle of operation to evacuate solution from said chamber, and for subsequently closing said inlet and opening said connecting means to permit gravity displacement of liquid in said chamber by solution from said container.

13. The apparatus of claim 12 wherein said liquid flow line includes valve means downstream of said chamber operable to prevent the escape of liquid from the outlet of said chamber during conditions of non-flow through said inlet.

References Cited in the file of this patent

UNITED STATES PATENTS

| | | |
|---|---|---|
| 324,080 | Butterfield | Aug. 11, 1885 |
| 412,910 | Blessing | Oct. 15, 1889 |
| 577,806 | Furness | Feb. 23, 1897 |
| 600,206 | Mayer | Mar. 8, 1898 |
| 616,243 | Mayer | Dec. 20, 1898 |
| 632,091 | Bommarius | Aug. 29, 1899 |
| 680,380 | Hyde | Aug. 13, 1901 |
| 1,526,669 | Henning | Feb. 17, 1925 |
| 1,680,103 | Hardy | Aug. 7, 1928 |
| 1,692,706 | Sealey | Nov. 20, 1928 |

(Other references on following page)

UNITED STATES PATENTS

| | | |
|---|---|---|
| 1,937,893 | Hutton | Dec. 5, 1933 |
| 1,976,445 | Jurs | Oct. 9, 1934 |
| 2,025,570 | Clark | Dec. 24, 1935 |
| 2,076,321 | Pick | Apr. 6, 1937 |
| 2,128,721 | Watts | Aug. 30, 1938 |
| 2,195,616 | Chesson | Apr. 2, 1940 |
| 2,212,436 | Clements | Aug. 20, 1940 |
| 2,570,131 | Koupal | Oct. 2, 1951 |
| 2,584,395 | Marvel | Feb. 5, 1952 |
| 2,661,244 | Baily | Dec. 1, 1953 |
| 2,688,339 | Dexter | Sep. 7, 1954 |

FOREIGN PATENTS

| | | |
|---|---|---|
| 830,778 | Germany | Feb. 7, 1952 |